United States Patent [19]
Shimo

[11] Patent Number: 5,590,419
[45] Date of Patent: Dec. 31, 1996

[54] VARIABLE POWER CIRCUIT AND APPARATUS USING THE POWER CIRCUIT

[75] Inventor: Norio Shimo, Kanagawa, Japan

[73] Assignee: Sony Corporation, Tokyo, Japan

[21] Appl. No.: 200,665

[22] Filed: Feb. 23, 1994

[30] Foreign Application Priority Data

Feb. 26, 1993 [JP] Japan ................................ 5-039032

[51] Int. Cl.$^6$ ........................................ H04B 1/04
[52] U.S. Cl. ................ 455/127; 455/38.3; 455/343; 307/44; 307/109
[58] Field of Search ................ 455/38.2, 38.3, 455/127, 343, 228; 315/76; 307/43, 44, 45, 46, 80, 81, 85, 86, 87, 109, 130; 320/56; 370/77, 95.3

[56] References Cited

U.S. PATENT DOCUMENTS 4,495,649  1/1985  Iwata .............................. 455/115
5,015,918  5/1991  Copeland ........................ 315/76

Primary Examiner—Edward F. Urban
Assistant Examiner—Philip J. Sobutka
Attorney, Agent, or Firm—Ronald P. Kananen

[57] ABSTRACT

A portable radiocommunication apparatus on a time division multiplex communication system includes a power amplifier circuit, signal processing circuit, battery, stepping up circuit, storing circuit, and a switch circuit. The power amplifier circuit amplifies a transmitted signal intermittently transmitted at predetermined periods to a radio transmission power level. The signal processing circuit is operated by a voltage lower than the operating voltage of the power amplifier circuit. The battery is for example a battery constituted of a lithium ion battery, of which the unit cell has a full-charged voltage lower than the operating voltage of the power amplifier circuit and an ultimate voltage higher than the operating voltage of the signal processing circuit, with a large voltage difference between the full-charged voltage and the ultimate voltage. The stepping up circuit is a circuit with small output current capacity, operating at the voltage within the range changing from the full-charged voltage to the ultimate voltage of the battery, amplifies the output voltage of the battery at least to the operating voltage of the power amplifier circuit. The storing circuit stores power of which the voltage is stepped up by the stepping up circuit. The switch circuit is provided between the storing circuit and the power-supply terminal of the power amplifier circuit and supplies the stored power in the storing circuit to the power amplifier circuit only while the power amplifier circuit is amplifying the transmitted signal in substance.

9 Claims, 5 Drawing Sheets

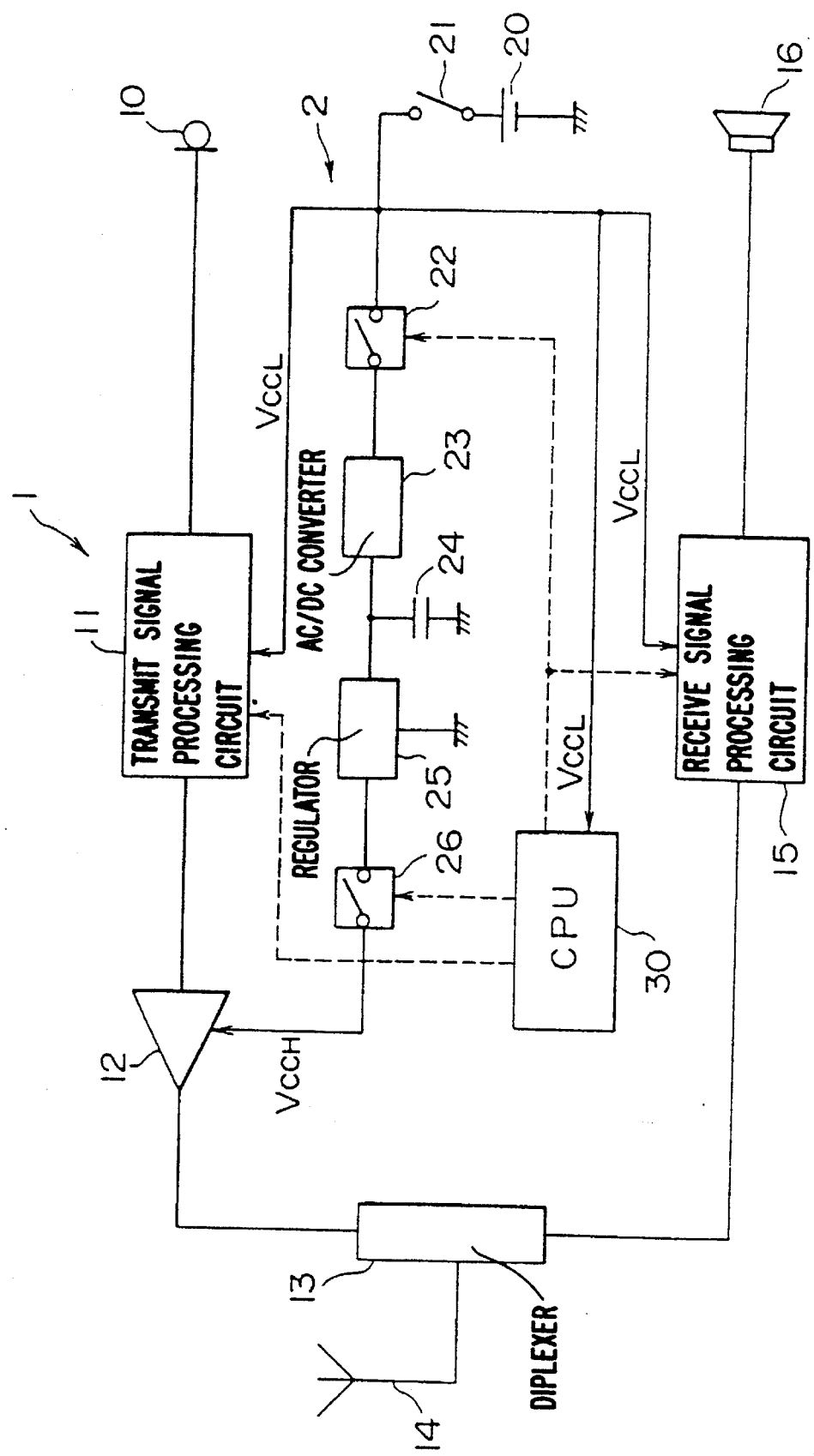

F I G. 4(A)
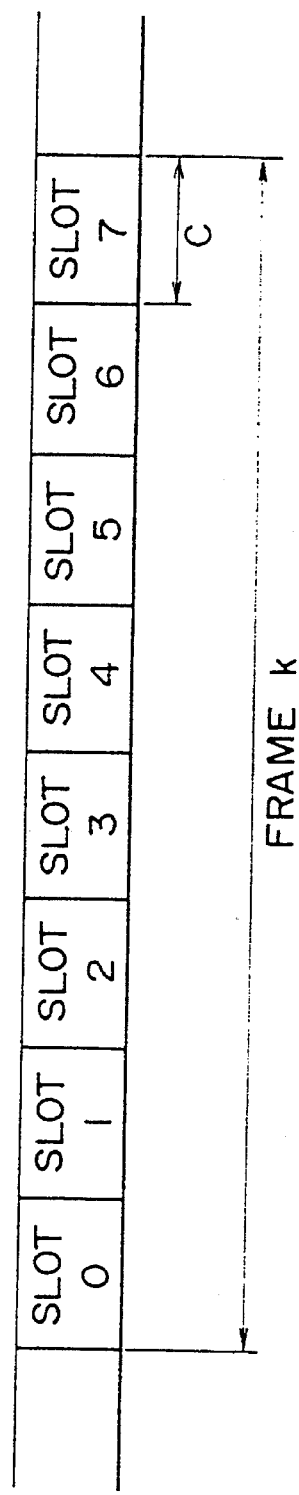
F I G. 4(B)

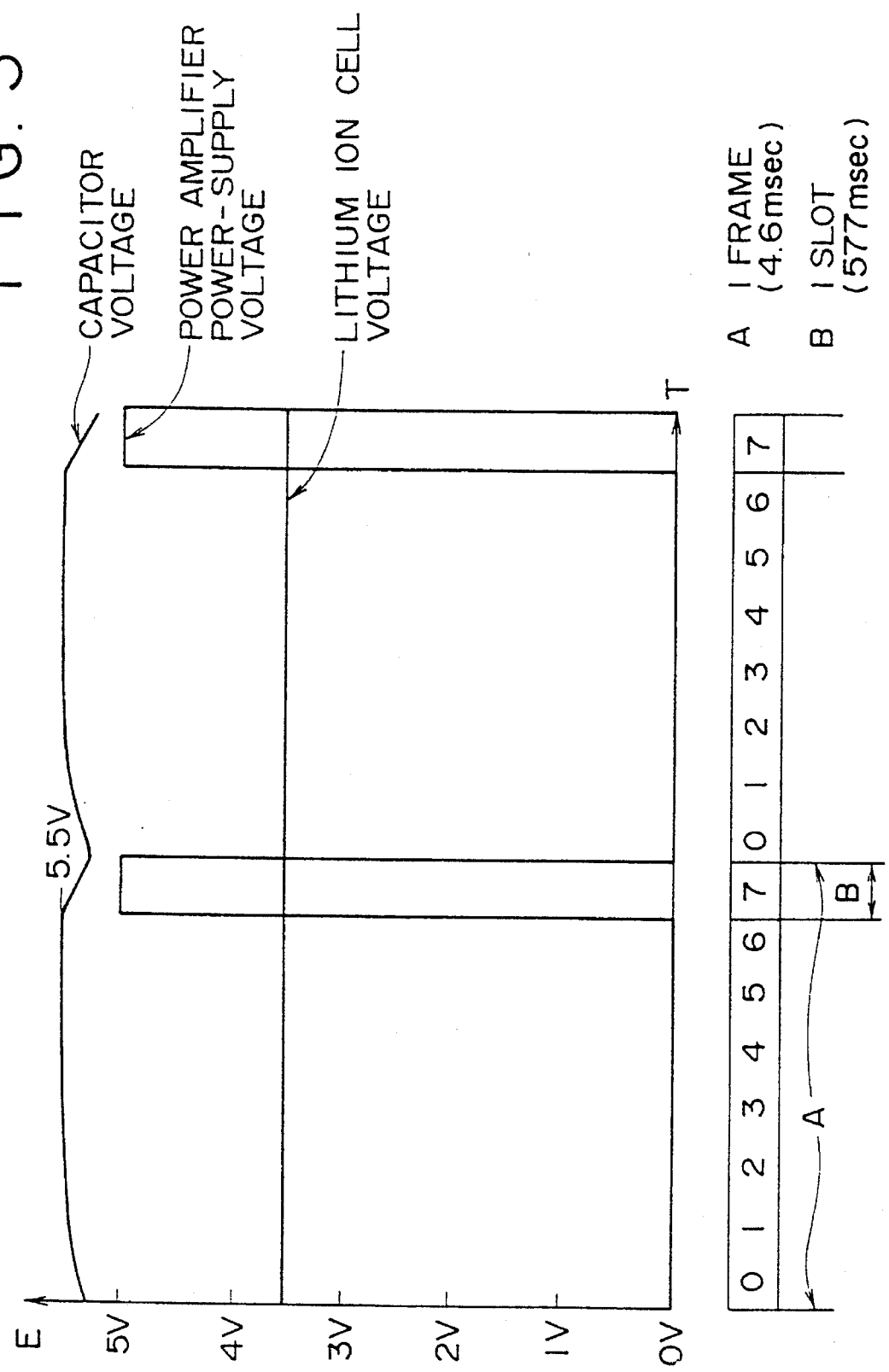

5,590,419

VARIABLE POWER CIRCUIT AND APPARATUS USING THE POWER CIRCUIT

BACKGROUND OF THE INVENTION

1. Field of the Invention

The present invention relates to a power circuit and a radiocommunication apparatus using the same. The present invention, more particularly, relates to a power circuit to supply power by stepping up the output voltage of a battery and a radiocommunication apparatus using the power circuit.

2. Background of the Invention

In mobile communication equipment such as a portable telephone which a user can carry and use for communication, its small size and light weight is an important factor for convenience of users.

Electronic circuits incorporated in radiocommunication apparatuses are generally formed with semiconductor devices so that the apparatus may be small sized, light weight, and power saving. Of the parts mounted on a radiocommunication apparatus, one main element which is particularly bulky and weighty is a battery as the power source to operate electronic circuits in the radiocommunication apparatus.

While electronic circuits in a radio communication apparatus are designed to achieve energy saving, it is required for the apparatus to amplify its transmitted signal to a certain level in order that the transmitted wave output, i.e., the transmitted distance, is kept above a certain value. Therefore, the power amplifier circuit used for the amplification is operated by a voltage higher than the operating voltage of the circuits for processing transmitted and received signals.

Thus, in a radiocommunication apparatus, there are incorporated circuits operated by at least two kinds of voltages, i.e., signal processing circuits which are constituted of a microprocessor, or DSP, DRAM, and the like, operated by a low voltage, and a power amplifier circuit operated by a higher voltage than that for the signal processing circuits. Therefore, it is required for the power circuit to supply at least two kinds of voltages.

The power consumed in the power amplifier circuit is larger than the power consumed in the signal processing circuits. Hence, the battery capacity is generally specified by the transmitted wave power.

In order to increase the transmission distance, i.e., transmitted wave power, it is necessary to increase the battery capacity. However, the increase in the battery capacity contradicts the requirement of the radiocommunication apparatus to be light and portable.

As a method to overcome the above mentioned problem, there is a method for example disclosed in the gazette of Japanese Laid-open Patent Publication No. Sho 61-144131. The method disclosed in the gazette of Japanese Laid-open Patent Publication No. Sho 61-144131 is based on the fact that time division multiplex communication is generally practiced in the mobile communication and it is proposed therein that power of a battery be stored in a capacitor at the timing (during the period) when the radiocommunication apparatus performs no transmission and the stored power on the capacitor be supplied to a power amplifier circuit at the timing when the radiocommunication apparatus performs transmission.

The time division multiplex communication for example is such a communication method that divides one frame into a plurality of slots and allots each slot to a call to thereby make it possible for a plurality of calls to be made at the same time.

As a system for the time division multiplexing, for example TDMA system, or TDD system, is known.

According to the above mentioned method, such merits can be obtained so that power saving in the power amplifier circuit can be achieved because the time required for operating the power amplifier circuit can be shortened and, since the power is supplied to the power amplifier circuit from the power stored on the capacitor, a large current free from the internal resistance of the battery can be supplied. Namely, even if the battery capacity is not large, a radiocommunication apparatus capable of transmitting signals over a long distance can be structured.

However, there still are some drawbacks in the method disclosed in the gazette of Japanese Laid-open Patent Publication No. Sho 61-144131.

A battery with a low output voltage is generally small and economical. In the method disclosed in the gazette of Japanese Laid-open Patent Publication No. Sho 61-144131, however, it is required that a battery whose output voltage is corresponding to the operating voltage of the power amplifier circuit should be used. For example, supposing that the operating voltage of the power amplifier circuit is 7 V and normally used nickel-cadmium (Ni—Cd) cells with a voltage of 1.3 V or so per cell are used as the battery, it is required that six cells of the nickel-cadmium cells should be used. Hence, the battery comes to occupy a large space (becomes bulky) and this contradicts the requirement of the radiocommunication apparatus to be smaller in size.

There is proposed a method in which a low-voltage battery is used and it is adapted such that the signal processing circuits are supplied with the battery voltage and the power amplifier circuit is supplied with a high voltage obtained by stepping up the battery voltage by means of a DC/DC converter or the like.

The above method, however, has not been applied to a radiocommunication apparatus on a time division multiplex system. Since the operation of the power supply at the timing corresponding to the time division multiplexing is not considered in this method, it is still encountering the difficulties of the battery capacity and the bulkiness of the DC/DC converter. In addition, since the DC/DC converter does not have 100% efficiency, efficient power supply cannot be achieved with it alone.

Therefore, such a problem is encountered in this method that the span of life of the battery becomes short.

Of course, an attempt is being made to achieve power saving of the power amplifier circuit itself.

For example, a gallium-arsenide (Ga—As) semiconductor device is suitable for operation at low voltage and applicable, as a power amplifier circuit element, to a high-frequency power amplifier circuit (RF power amplifier), which is being developed for use in transmission with portable mobile transmission equipment, such as a portable telephone. Its standard power-supply voltage is 5.8 V or 5.0 V. Namely, while a voltage of 7 V or so was earlier required for the power-supply voltage, it has been lowered to around 5.8 to 5.0 V.

While the operating voltage of signal processing circuits earlier was around 5 V, it has been lowered to around 2.7 to 3.3 V owing to the development in the semiconductor circuit technology.

The inventors of the present application have already proposed a power supplying method suitable for operating electronic circuits in a radiocommunication apparatus on a time division multiplexing system having at least two kinds of electronic circuits operating at two kinds of voltages as described above for example in the gazette of Japanese Laid-open Patent Publication No. Hei 4-315320.

In this method, signal processing circuits other than the power amplifier circuit are arranged to be operated by a low voltage around 3 V and a battery whose ultimate voltage is around the operating voltage of the signal processing circuits is mounted thereon so that the signal processing circuits can be operated directly by the output voltage of the battery. On the other hand, as the driving (operating) voltage of the power amplifier circuit, the output voltage of the battery is stepped up to the operating voltage of the power amplifier circuit, for example 5 V or above, using a DC/DC converter. Further, the power of which the voltage is stepped up is stored in a small capacitor while the apparatus is not transmitting a signal and, while the apparatus is transmitting a signal, the power stored on the capacitor is supplied to the power amplifier circuit to operate it preferably through a regulator, which adjusts the voltage level of the supplied power.

As a result, a meritorious effect was obtained that the power supply to the signal processing circuits operating at low voltage and the power supply from the battery to the power amplifier circuit operating at higher voltage can be efficiently carried out.

Since what was disclosed in the gazette of Japanese Laid-open Patent Publication No. Hei 4-315320 was the basic circuit configuration and operation of the circuit, there were not exemplified particular types of batteries, but use of a Nickel-Cadmium (Ni—Cd) battery was considered suitable for higher efficiency, in view of its small change in the discharge drooping characteristic, and practical according to the art at the time of the application.

However, since the output voltage of the Nickel-Cadmium battery is as low as 1.2 V per cell as shown in FIG. 1, three Ni—Cd cells must be used even if the signal processing circuits is arranged to be operated by a low voltage of 3 V. Thus, there has still been a limit in decreasing the size of the radiocommunication apparatus.

Further, the use of Nickel-Cadmium batteries has come to be controlled on account of their causing environmental pollution.

On the other hand, a lithium ion cell has come to be taken note of as a pollution-free cell and as the constituent of a battery having a high output voltage (large battery capacity) per cell, its full-charged voltage being around 4.3 V and its ultimate voltage around 2.7 V, for example, as shown in FIG. 1.

If the ultimate voltage is around 2.7 V, the signal processing circuit driven by the voltage from 2.7 to 3.3 V can be operated using only one cell of the lithium ion cell and this contributes to realization of a small radiocommunication apparatus. Therefore, the lithium ion cell is preferred to the nickel-cadmium cell as the cell to be mounted on the radiocommunication apparatus.

Discharge drooping characteristics of the nickel-cadmium (Ni—Cd) cell and the lithium ion cell are shown in FIG. 1.

However, in the discharge drooping characteristic of the lithium ion cell, the discharging curve linearly lowers from the full-charged voltage to the ultimate voltage producing a large potential difference, from 100% to 60–65%.

As a result, there arises a problem that energy at the portion of the area a in FIG. 2 is not used effectively. This problem becomes remarkable particularly when a power-supply regulator with its output voltage close to the ultimate voltage is inserted between the lithium ion cell and the signal processing circuit.

This is because the output voltage of the power-supply regulator is constantly set to the ultimate voltage even when the output voltage of the cell is above the ultimate voltage, and then, the power obtained from the voltage exceeding the ultimate voltage multiplied by the output current is dissipated in the power-supply regulator.

Details of it will be described below.

The energy in the area (b) shown in FIG. 2 is the energy effectively supplied from the cell to each circuit.

Energy utilization efficient $\eta$ is given by the expression (1) below.

$$\eta = \text{energy in area (b) in FIG. 2} / [\text{energy in area (b) in FIG. 2} + \text{energy in area (a) in FIG. 2}] \quad (1)$$

When it is assumed that an ideal power-supply regulator whose voltage drop is 0 V is used with its output set to the ultimate voltage of the nickel-cadmium cell to supply power to each circuit in the radiocommunication apparatus, the efficiency $\eta$ becomes approximately 95% because the change in the voltage drooping characteristic is small.

On the other hand, the efficiency $\eta$ with the lithium ion cell becomes as low as approximately 77% because the change in the discharge drooping characteristic is large and the energy at the portion in the area (b) in FIG. 2 is wasted.

Thus, when a lithium ion cell is used, it provides a greater energy density, but, because its discharge drooping characteristic has a large change in the output voltage, there arises the problem of its efficiency $\eta$ becoming lower than the nickel-cadmium cell when it is used for supplying power to each circuit of the radiocommunication apparatus through a power-supply regulator.

These days, the driving voltage of a large capacity DRAM is becoming as low as the level of 1 V.

The driving voltage of the signal processing circuit formed with a microprocessor is becoming still lower. On the other hand, the driving voltage of a transmitting power amplifier circuit is still high and power consumption therein is great. Hence, there is a tendency that the difference between the driving voltages of the power amplifier circuit and the signal processing circuit is becoming greater and, hence, the above described problem is becoming still more serious.

SUMMARY OF THE INVENTION

It is, therefore, an object of the present invention to provide a power circuit which resolves the above mentioned problem.

It is another object of the present invention to provide a radiocommunication apparatus on a time division multiplex communication system which resolves the above mentioned problem.

According to the present invention, there is provided a power circuit for supplying power from the same battery to a first circuit operated by a low voltage and a second circuit intermittently operated by a higher voltage than the first circuit. The power circuit includes a battery, a stepping up and storing circuit, and a power supply control circuit. The battery has its unit cell having a full-charged voltage lower than the operating voltage of the second circuit and an ultimate voltage higher than the operating voltage of the first circuit. The stepping up and storing circuit steps up the voltage of the battery, changing within the range between the full-charged voltage and the ultimate voltage, to the operating voltage of the second circuit and stores the stepped up power. The power supply control circuit supplies the power stored in the stepping up and storing circuit to the second circuit only while the second circuit is operating in substance.

According to the present invention, there is provided a radiocommunication apparatus on a time division multiplex communication system including a power amplifier circuit, signal processing circuit, battery, stepping up circuit, storing circuit, and a switch circuit. The power amplifier circuit amplifies a transmitted signal intermittently transmitted at predetermined periods to a radio transmission power level. The signal processing circuit operates at a voltage lower than the operating voltage of the power amplifier circuit. The battery is such a battery of which a unit cell has a full-charged voltage lower than the operating voltage of the power amplifier circuit and an ultimate voltage higher than the operating voltage of the signal processing circuit, and hence has a large voltage difference between the full-charged voltage and the ultimate voltage. The stepping up circuit is such that has a small output current capacity and steps up the output voltage of the battery, changing within the range between the full-charged voltage and the ultimate voltage, at least to the operating voltage of the power amplifier circuit. The storing circuit stores power of which the voltage is stepped up by the stepping up circuit. The switch circuit is provided between the storing circuit and the power amplifier circuit and supplies power stored in the storing circuit to the power amplifier circuit only while the power amplifier circuit is amplifying the transmitted signal in substance.

According to the present invention, it is made possible to provide a power circuit capable of efficiently supplying power to electronic circuits operating at least two different operating voltages by using the same battery, constituted of a small number of cells, i.e., one cell or so, of for example lithium ion cells, having a large difference between the full-charged voltage and the ultimate voltage and being great in energy density.

By applying the power circuit according to the invention to a radiocommunication apparatus on a time division multiplex system, it is made possible to make the radiocommunication apparatus smaller and lighter and to prolong the span of life of the battery.

BRIEF DESCRIPTION OF THE DRAWINGS

FIG. 3 is a block diagram showing a structure of an embodiment of a radiocommunication apparatus of the invention;

FIG. 4(A) and FIG. 4(B) are diagrams explanatory of a TDMA communication system to which a radiocommunication apparatus of the invention is applied; and FIG. 5 is a diagram showing the relationship between the power supply to RF power amplifier in a radiocommunication apparatus of the invention and the slot in a TDMA communication system.

DESCRIPTION OF THE PREFERRED EMBODIMENTS

Figure 1:
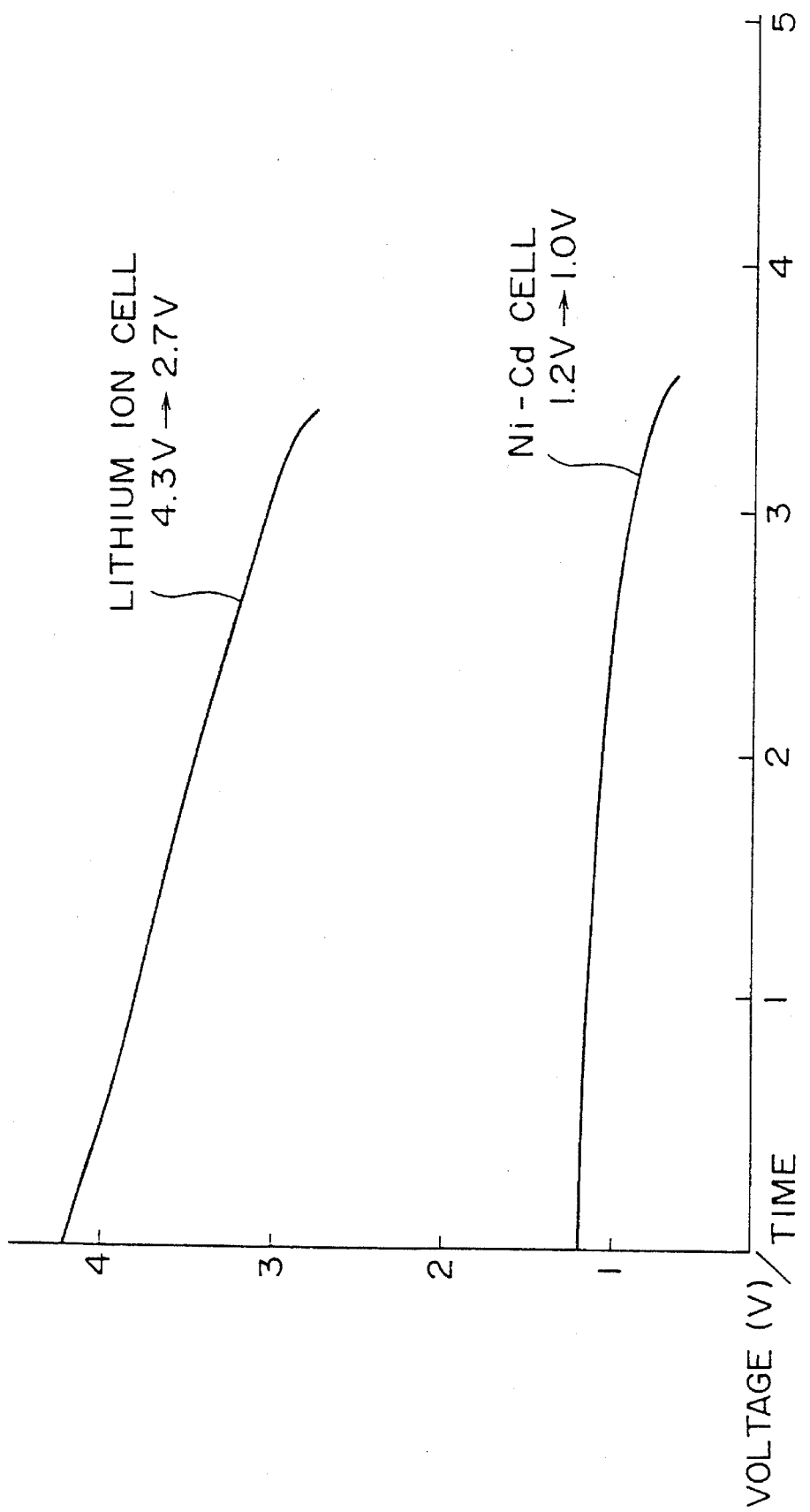
FIG. 1 is a diagram showing discharge drooping characteristics of a lithium ion cell and a nickel-cadmium cell.

A preferred embodiment of a power circuit of the invention and a radiocommunication apparatus on a time division multiplex communication system using the power circuit will be described below in detail with reference to the accompanying drawings.

As time division multiplexing systems, there are known such systems as TDMA system and TDD system. In the following embodiment, a multiplex communication system for GSM (Group Special Mobile) will be described as an example.

FIG. 3 is a block diagram showing a structure of a radiocommunication apparatus 1 as an embodiment of the invention.

The radiocommunication apparatus 1 of the invention is a portable telephone for GSM. When a telephone call is made, signal transmission and reception are performed at the timing of the time slot on the transmission frame allotted to the call. In this radiocommunication apparatus 1, the transmitted signal and the received signal are allotted different frequency bands so that full duplex communication is performed.

While a transmitted signal is being actually transmitted, having power, of which the voltage is stepped up by a DC/DC converter, as a step up means, temporarily stored on a capacitor, the stored power is discharged and supplied to the transmission system, and while no transmission is being made, the output voltage of a battery is stepped up and stored on the capacitor.

A transmit signal processing circuit 11 analog-to-digital converts a speech signal input from a microphone 10, applies band compression to the digitized speech signal, and assigns the signal to the time slot on the transmission frame allotted to the call and modulates the carrier wave signal at the transmit frequency. The output signal from the transmit signal processing circuit 11 is input to an RF power amplifier 12 as a transmitted signal.

The RF power amplifier 12 is constituted for example of a Ga—As transistor and the like. The RF power amplifier 12 is operated for example by a power-supply voltage of 5.0 V and, receiving a power supply from a power circuit 2, amplifies the transmitted signal to that with predetermined power, for example 2 to 5 W. The transmitted signal thus amplified is transmitted through a diplexer 13 and an antenna 14.

The diplexer 13 is a circuit provided for enabling signal transmission and reception to be carried out with the same antenna 14 and is constituted of inductive element (L), capacitive element (C), and the like. The diplexer 13 performs signal combination and separation so that a signal-compressed received signal from the antenna 14 may be input only to a receive signal processing circuit 15 and the transmitted signal from the RF power amplifier 12 may be sent to the antenna 14 and not sneak into the side of the receive signal processing circuit 15.

The receive signal processing circuit 15 amplifies the received signal input from the antenna 14 through the diplexer 13, performs detection, expands the signal-compressed received signal to decode the speech signal, and outputs the speech signal from a speaker 16 as speech sound.

A battery 20 is constituted of one lithium ion cell with an output voltage of 3.6 V ($V_{CCL}$).

The battery 20 directly supplies power to the transmit signal processing circuit 11 and receive signal processing circuit 15 via a power switch 21 and supplies power, through the power circuit for RF power amplifier 2, to the RF power amplifier 12.

In concrete terms, the voltage of the operable range of each part of the signal processing circuits within the radiocommunication apparatus 1 other than the RF power amplifier 12, i.e., the transmit signal processing circuit 11 and the receive signal processing circuit 15, is 3 V. As the power supply for each part of the signal processing circuits, one lithium ion cell whose nominal output voltage is 3.6 V is used as described above.

The power switch 21 is used by the operator for turning on and off the power supply to the whole radiocommunication apparatus 1.

The power circuit for the RF power amplifier 2 is formed of the following parts and supplies power to the RF power amplifier 12.

A first switch 22 is activated under the control of a CPU 30 of a microprocessor constituting the signal processing circuit to close its contact when the radiocommunication apparatus 1 performs transmission so that the battery 20 and a DC/DC converter 23 are connected.

The DC/DC converter 23 as stepping up means steps up the output voltage 3 V of the battery 20 to 5.5 V, the operating voltage of the RF power amplifier 12, and supplies its output to a capacitor 24 and a regulator 25.

The capacitor 24 is charged by the DC/DC converter 23 while the RF power amplifier 12 is not operating in substance, i.e., while no transmitted signal is being transmitted in substance, and its terminal connected with the DC/DC converter 23 is stepped up to 5.5 V, virtually the same as the output voltage. Thereby, the power required for operating the RF power amplifier 12 is stored on the capacitor 24 in the form of electric charge.

During the period that the RF power amplifier 12 operates in substance and a transmitted signal is transmitted, the charge stored on the capacitor 24 is output to the RF power amplifier 12 through the regulator 25 as the required power for the RF power amplifier 12.

The regulator 25 regulates (smooths) the voltage supplied from the DC/DC converter 23 and the capacitor 24 to thereby produce a constant power-supply voltage 5 V ($V_{CCH}$) for the RF power amplifier 12 and supplies it to the RF power amplifier 12.

A second switch 26, under the control of the CPU 30, connects the regulator 25 and the power-supply terminal of the RF power amplifier 12 while the RF power amplifier 12 is performing signal transmission, so that the power is supplied to the RF power amplifier 12.

The CPU 30 executes operation control of the transmit signal processing circuit 11, receive signal processing circuit 15, the first switch 22, and the second switch 26 as indicated by broken lines in FIG. 3.

The above described parts of the radiocommunication apparatus 1 are interconnected as shown in FIG. 3.

The operation of the radiocommunication apparatus 1 will be described below.

First, the TDMA communication system to which the communication apparatus 1 of the invention is applied will be described.

FIG. 4(A) and FIG. 4(B) are diagrams explanatory of the TDMA communication system.

In the TDMA communication system, transmission frames are set up for the frequency at which the radiocommunication apparatus 1 performs transmission as shown in FIG. 4(A).

The transmission frame is divided for example into eight slots as shown in FIG. 4(B), and the communication apparatus 1 is allotted one slot for use in the transmission at each call. The radiocommunication apparatus 1 performs the transmission to the allotted slot.

Thus, transmission frames are set up for one frequency and a plurality of slots are provided in the transmission frame and each of a plurality of radiocommunication apparatuses using this frequency utilizes each of the slots so that a plurality of calls can be achieved by using the same frequency.

In this example, the radiocommunication apparatus 1 performs transmission using the slot indicated by character C in FIG. 4(B).

Namely, the RF power amplifier 12 of the radiocommunication apparatus 1 transmits a signal only during the period corresponding to ⅛ of the entire period of the transmission frame and does not transmit a signal during the period corresponding to ⅞, i.e., in the remaining vacant slots.

In the transmission of the radiocommunication apparatus 1 for GSM in the present embodiment, one frame has a width of time of 4.6 msec and one slot has it of 577 μsec, and the radiocommunication apparatus 1 is designed to operate at such timing.

The control of the timing of transmission to the slot is executed by the CPU 30.

More specifically, before a call is started, a control sequence is performed between a base station of the mobile communication and the apparatus and, in the control sequence, a slot to be used for the call is specified.

The slot is recognized by the CPU 30 and control is executed over the transmit signal processing circuit 11 and the receive signal processing circuit 15 with respect to the time slot.

According to the timing of transmission, the CPU 30 controls the second switch 26 and, thereby, a suitable power supply to the RF power amplifier 12 is achieved only while the signal is being transmitted.

More specifically, the second switch 26 is turned on immediately before the start of the slot in which the RF power amplifier 12 transmits the signal and the second switch 26 is turned off immediately after the end of the slot.

The user turns on the first switch 22 after the above described control sequence has been completed.

FIG. 5 shows a relationship between the power supply to the RF power amplifier 12 of the radiocommunication apparatus 1 and the slot in the TDMA communication system.

In this example, the radiocommunication apparatus 1 performs transmission in the form of a burst signal using the seventh slot shown in FIG. 5(B) of the transmission frame shown in FIG. 5(A).

As shown in FIG. 5, the output voltage of the battery 20 is at a constant value between 2.7 V and 4.3 V whether or not the RF power amplifier 12 makes transmission.

FIG. 5 shows a particular case where the output voltage of the battery 20 is 3.6 V.

The RF power amplifier 12 transmits a signal only at the seventh slot of the slots of the transmission frame.

Accordingly, during the period from the zeroth to sixth slots, the CPU 30 controls the second switch 26, So that the power supply from the regulator 25 to the RF power amplifier 12 is stopped.

In the meantime, the power of which the voltage is stepped up by the DC/DC converter 23 is charged on the capacitor 24. The voltage at the terminal of the capacitor 24 connected with the DC/DC converter 23 becomes 5.5 V virtually the same as the output voltage of the DC/DC converter 23 immediately before the start of the seventh slot.

At the timing of the start of the seventh slot, the CPU 30 activates the second switch 26 so that power is supplied to the RF power amplifier 12.

Accordingly, the voltage at the terminal of the capacitor 24 is somewhat lowered as the electric charge is discharged.

The output capacity of the DC/DC converter 23 and the capacitance of the capacitor 24 are determined such that the power consumed while the voltage is lowered may correspond to the quantity of power which the regulator 25 and the RF power amplifier 12 need.

For the RF power amplifier 12 used in the radiocommunication apparatus 1, a hybrid module employing a Ga—As FET as described above is used and it operates under the conditions shown in Table 1.

Table 1

Output frequency ( f ): 890 MHz

Input power ($P_{in}$): 1 mW

Power-supply voltage ($V_{CCH}$): 5.0 V

Under the above conditions, the following results are produced.

Table 2

Output power ( $P_{out}$ ): 2.55 W

Total drain-consumed power: 4.75 W

Efficiency ($\eta$): 2.55/4.75=54%

The characteristic of the DC/DC converter 23 is such that the efficiency $\eta$=84% when the input voltage ($V_{in}$) is 2.7 V to 4.3 V and the output voltage ($V_{out}$) is 5.5 V. The maximum output current is 0.3 A.

While the power-supply current necessary for the RF power amplifier 12 to make continuous transmission is around 1A, the transmission is, in reality, performed intermittently (in the form of a burst signal) as described above.

Accordingly, it will be satisfactory if the DC/DC converter 23 has sufficient current capacity to store the power necessary for the transmission on the capacitor while no transmission is being made.

Therefore, the output current capacity of the DC/DC converter 23 at the above described level will be sufficient for use in the radiocommunication apparatus 1.

Using the RF power amplifier 12 and DC/DC converter 23 as described above and using the following circuit elements, the efficiency $\eta$ was measured.

Table 3

Capacitor 24: a capacitor of 3,300 μF/6.3 V was used

The first switch 22, the second switch 26:

a series path transistor (pnp junction type) with a low voltage drop (<0.1 V) was used Regulator 25: a device with a low voltage drop, i.e., having a small difference between input and output voltages, was used When the DC/DC converter 23 (DC/DC converter stepping up 3.6 V to 5.5 V) and the regulator 25 (regulator providing an output of 5 V) were used, the efficiency of the RF power amplifier 12 when used at a duty cycle of ⅛ was 42%.

Since the efficiency of the RF power amplifier 12 when an ordinary DC power supply was used was 54% as described above, the efficiency $\eta$ of the power circuit for RF power amplifier 2 becomes 42% / 54%=78%.

The reason why this efficiency is lower than the efficiency of the DC/DC converter 23 proper is because power is consumed not only in the RF power amplifier 12 but also in the regulator 25.

As the merit obtained from the use of the DC/DC converter 23, it can be mentioned that the efficiency is kept constant irrespective of changes in the input voltage ($V_{in}$).

Figure 2:
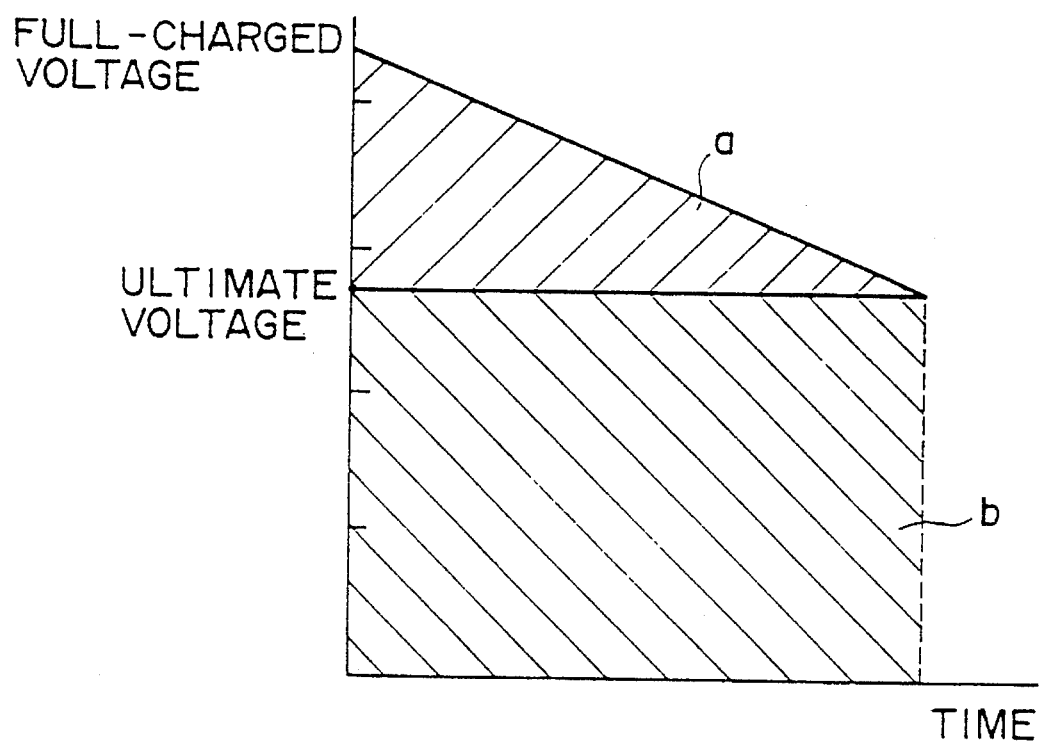
FIG. 2 is a diagram showing utilizable energy output from a lithium ion cell when a serially connected Power-supply regulator is used.

When such a battery as a lithium ion battery of which the discharge curve has a large difference between the full-charged voltage and the ultimate voltage as shown in FIG. 1 is used and a serially connected power-supply regulator whose output voltage is set to the ultimate voltage is used for supplying power to the RF power amplifier 12, the energy indicated by the area a in FIG. 2 is all consumed in this regulator.

The portion of energy indicated by the area a in FIG. 2 corresponds to 30% of the effectively used energy indicated by the area b in FIG. 2.

In the present example, the ultimate voltage of the lithium ion cell is approximately 63% of the full-charged voltage.

When the power circuit for RF power amplifier 2 is used for supplying power to the RF power amplifier 12, it is possible to supply the RF power amplifier 12 with energy both in the areas a and b in FIG. 2.

The efficiency $\eta$ relative to the latent energy of the lithium ion battery used for the battery 20 will be obtained below.

As described above, the efficiency $\eta$ of the RF power amplifier 12 when used at a duty cycle of ⅛ using the DC/DC converter 23 (a DC/DC converter for stepping up 3.6 V to 5.5 V) and the regulator 25 (a regulator whose output is 5 V) is 42%.

At this time, the energy utilization efficiency of the lithium ion battery is 100%.

The efficiency $\eta$ of the RF power amplifier 12 using a battery of a high output voltage (ultimate voltage: 5 V) and an ordinary serially connected power-supply regulator is 54%.

Since, in this case, the energy utilization efficiency of the lithium ion battery is 77%, (42%×100%)/(54%×77%)≈100%.

Thus, according to the present embodiment, the portion which was dissipated as a loss when a conventional serially connected power-supply regulator was used for supplying power to the RF power amplifier 12 can be effective utilized.

Namely, there is no much difference in terms of energy utilization efficiency between the case where power is supplied to the RF power amplifier 12 by a serially connected power-supply regulator with the use of a battery of a high output voltage and the case where, as described in the present embodiment, power is supplied to the RF power amplifier 12 through the power circuit for RF power amplifier 2 with the use of a battery of a low output voltage (3.6 V).

Accordingly, a great merit can be obtained from the power supply to the RF power amplifier 12 by the use of the power circuit for RF power amplifier 2 of the invention capable of using a battery of low output voltage, which is smaller and more economical.

The total volume of the described DC/DC converter 23 and the capacitor 24 is around 3 cc and, hence, it has been made possible to provide a radiocommunication apparatus 1 in a smaller size, which also has a merit that the battery 20 can be constituted of one cell.

The radiocommunication apparatus 1 performs communication having the RF power amplifier 12 supplied with power in the above described manner.

Namely, the speech of the user input from the microphone 10 is processed in the transmit signal processing circuit 11 and output at the allotted slot through the RF power amplifier 12, diplexer 13, and the antenna 14.

At the same time, a received signal from the party on the other end intercepted by the antenna 14 is supplied, through the diplexer 13, to the receive signal processing circuit 15 and decoded therein to a speech signal and transmitted to the user through the speaker 16 and, thus, the call is effected.

While a communication apparatus for GSM has been described in the above embodiment, the power supplying method to the RF power amplifier applied to the communication apparatus of the present invention can be applied to other mobile communication equipment in general.

It is possible for the radiocommunication apparatus of the present invention to be arranged in other structures than that described above.

While the radiocommunication apparatus on the TDMA system has been exemplified in the above embodiment, the present invention can be applied to various apparatuses having circuit components operating intermittently, other than that for time division multiplex communication.

The above power circuit has been described as a suitable power circuit for supplying power to an RF power amplifier 12, but the power circuit can also be suitably applied to various apparatuses having a circuit operating at a low voltage such as a signal processing circuit and a circuit operating at a high voltage and, in addition, intermittently such as a power amplifier circuit.

Further, a case where a lithium ion battery is used as the battery has been exemplified as a preferred embodiment of the invention, but similar effects to the above can be obtained with another type of battery if it has a discharge drooping characteristic similar to that of the above described lithium ion battery and is capable of providing a relatively high output voltage.

In the above embodiment, a case where there are present two kinds of driving voltages for the signal processing circuit and the power amplifier circuit has been exemplified, but the invention can be applied to a case where three kinds or more of drive voltages are required, such as where an electronic circuit or a microprocessor using semiconductor devices constituting a signal processing circuit and circuits formed of memories such as DRAM, SRAM, ROM, or flush memory requiring different drive voltages are used.

What is claimed is:

1. A radiocommunication apparatus on a time division multiplex communication system comprising:

a power amplifier circuit for amplifying a transmitted signal intermittently transmitted at predetermined periods to a radio transmission power level;

a signal processing circuit operating at a voltage lower than the operating voltage of said power amplifier circuit;

a battery having a full-charged voltage lower than the operating voltage of said power amplifier circuit and an ultimate voltage higher than the operating voltage of said signal processing circuit, with a large voltage difference between the full-charged voltage and the ultimate voltage;

a stepping up circuit with a small output current capacity for stepping up the output voltage of said battery, changing within the range between the full-charged voltage and the ultimate voltage, at least to the operating voltage of said power amplifier circuit;

a storing circuit for storing power of which the voltage is stepped up by said stepping up circuit; and switch means provided between said storing circuit and said power amplifier circuit for supplying power stored in said storing circuit to said power amplifier circuit only while said power amplifier circuit is amplifying said transmitted signal.

2. A radiocommunication apparatus according to claim 1, wherein said stepping up circuit includes a DC/DC converter operating at least within the range of an input voltage thereto between the full-charged voltage and ultimate voltage of said battery for stepping up the input voltage to a voltage above the operating voltage of said power amplifier circuit.

3. A radiocommunication apparatus according to claim 1, wherein said storing circuit has a capacitor.

4. A radio communication apparatus according to claim 1, wherein the ultimate voltage of said battery is less than 60% of the full-charge voltage.

5. A radiocommunication apparatus according to claim 1, wherein said battery is constituted of one lithium ion cell.

6. A radiocommunication apparatus according to claim 1, wherein said radiocommunication apparatus is a portable radiocommunication apparatus.

7. A radiocommunication apparatus according to claim 1, wherein said transmitted signal is a signal transmitted as a burst signal in concurrence with the timing slot allotted thereto correspondingly to the transmission timing of said transmitted signal and the power supply from said storing circuit to said power amplifier circuit is performed at the transmission timing of said burst signal.

8. A radiocommunication apparatus according to claim 7, wherein said signal processing circuit has a transmit signal generator circuit for generating a transmitted signal and supplying the generated signal to said power amplifier circuit, said switch means has a switch circuit provided between said storing circuit and said power amplifier circuit and control means for controlling said transmit signal generator circuit for timing and switching said switch circuit, and wherein said control means, while it is controlling said transmit signal generator circuit to generate a transmitted signal at predetermined timing, controls said switch circuit to turn on so that power stored in said storing circuit is supplied to the power-supply terminal of said power amplifier circuit, and during a period set thereby in which said transmit signal generator circuit is not allowed to generate a signal, controls said switch circuit to turn off so that the power supply from said storing circuit to said power amplifier circuit is stopped.

9. A radiocommunication apparatus according to claim 8, wherein said apparatus further comprises a power-supply switch connected between said battery and said stepping up circuit, said control means further controlling said power-supply switch to turn on when signal transmission using said power amplifier circuit is performed so that power is supplied from said battery to said stepping up circuit and controlling said power-supply switch to turn off when signal transmission using said power amplifier circuit is not performed so that power supply from said battery to said stepping up circuit is stopped.

\* \* \* \* \*